Sept. 5, 1967
M. RATKOVICH
3,339,942
RETRACTABLE WIDE LOAD TRAILER
Filed Oct. 15, 1965
2 Sheets-Sheet 1
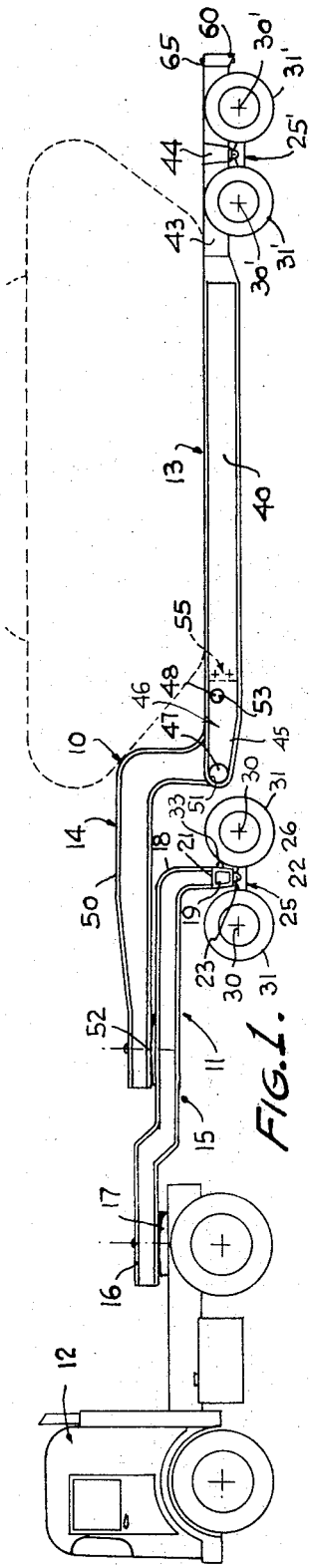
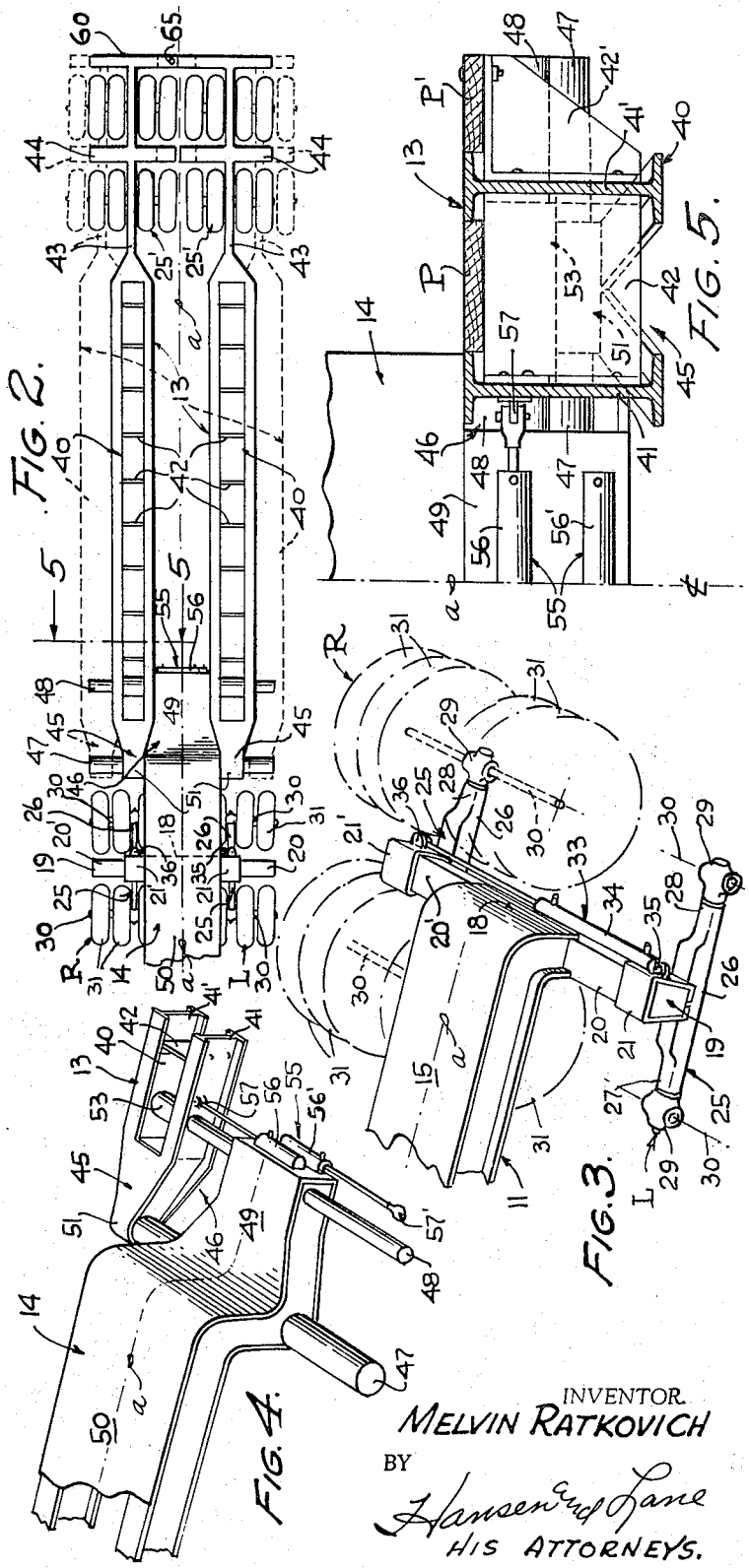
INVENTOR.
MELVIN RATKOVICH
BY
Hansen and Lane
HIS ATTORNEYS.

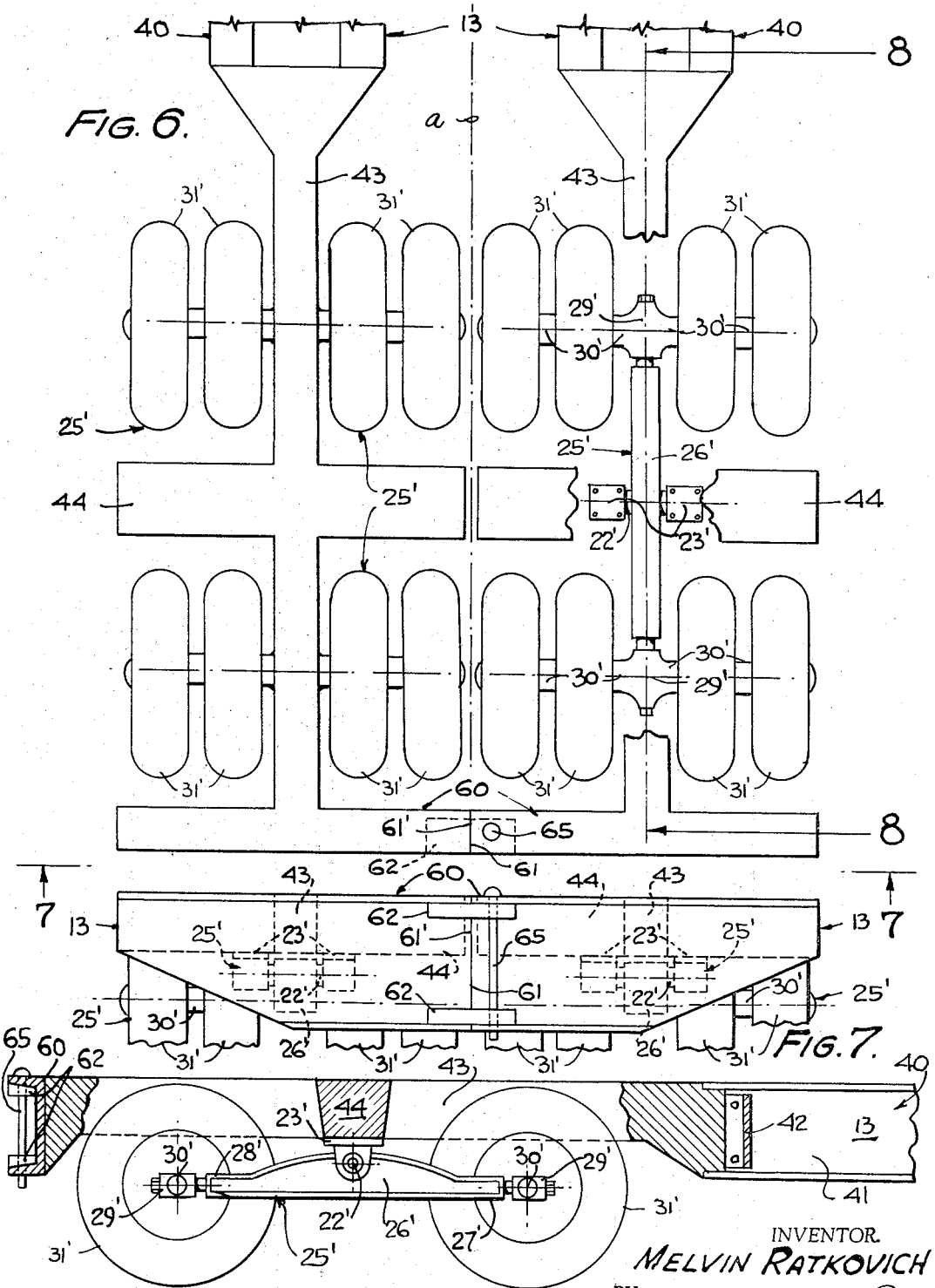

United States Patent Office 3,339,942
Patented Sept. 5, 1967

3,339,942
RETRACTABLE WIDE LOAD TRAILER
Melvin Ratkovich, 1555 Ashcroft Ave.,
Sunnyvale, Calif. 94087
Filed Oct. 15, 1965, Ser. No. 496,411
10 Claims. (Cl. 280—423)

ABSTRACT OF THE DISCLOSURE

A trailer having separate trailer beds connected to a common draft tongue for lateral movement outwardly and/or inwardly of the line of travel for spreading such trailer beds to accommodate wide loads when permissible and facilitating retraction of such trailer beds to normal vehicle width when wide load carriage is not permitted.

This invention relates to retractable wide load trailers for carrying heavy equipment having a width greater than the allowed normal limit.

The trailer embodying the present invention contemplates a construction adapted to spread from a normal eight (8) foot width, which is legally permissible on highways, to an eleven (11) foot width for carrying wide track slow moving equipment under special permit during daylight. Such wide load trailers must be off the road at night. Consequently, most wide load trailers and vehicles are tied up all night and must await daylight to return, even though empty. This requires a layover of the driver and delays use of such vehicle when it could actually be returning to home base.

It is an object of the present invention to provide a wide load trailer which is retractable into a normal width for use on highways at any and all times. This object contemplates the provision of wheeled gear and means for moving the same inwardly and/or outwardly relative to longitudinal center of the trailer.

It is another object of this invention to provide a simple yet effective means for spreading and/or drawing together separate trailer beds by manually controlled expandable and contractable means during slow rolling movement of the entire wide load trailer.

It is yet another object of the invention to provide in a wide load retractable trailer, a front running gear adapted to have turntable connection to a traction vehicle with gang wheel supporting carriages spreadable and retractable in conjunction with the spreading and retraction of the load bearing trailer beds thereof.

It is still a further object to provide an intermediate goose neck tongue adapted to have turntable connection with the front running gear and means for rigidly connecting independent load bearing trailer beds thereto for lateral movement under the influence of manually controlled expandable or contractable means as they are drawn slowly forward by a traction vehicle.

It is another object to provide a simple yet effective means for maintaining the laterally shiftable trailer beds within the allowable limits of their spaced parallel positions of adjustment.

These and other objects and advantages of the present invention will become apparent in the following description and claims when read in the light of the accompanying drawings in which:

FIG. 1 is a side elevational view of a trailer and hitch embodying the present invention.

FIG. 2 is a plan view of the trailer portion of FIG. 1.

FIG. 3 is a fragmentary perspective view of the front running gear of the trailer.

FIG. 4 is a fragmentary perspective view of the goose neck front of the trailer.

FIG. 5 is a half section through FIG. 2 taken substantially along line 5—5 thereon.

FIG. 6 is an enlarged plan view of the aft running gears of the trailer of FIG. 2.

FIG. 7 is a fragmentary rear elevational view of the aft end of the trailer as seen from line 7—7 in FIG. 6.

FIG. 8 is a fragmentary vertical section through one side running gear at the aft end of the trailer as seen from line 8—8 in FIG. 6.

The wide load retractable trailer generally designated 10 in FIG. 1 of the drawings includes a front running gear 11 adapted to be connected to a truck or tractor vehicle 12 and a pair of trailer beds 13 each connected by a goose neck tongue 14 to the front running gear 11.

The front running gear 11 comprises a turntable tongue 15 having its fore end 16 adapted to be pivotally connected to the traction vehicle 12 by a conventional turntable 17. The aft end of the tongue 15 terminates in a downwardly extending end 18 which is welded to a cross beam 19 having its outer ends 20–20' extending outwardly the full normal width (8 feet) permissible on vehicles.

Each end 20–20' of the cross beam 19 has a rider 21–21', respectively, thereon disposed to slide inwardly and outwardly laterally of the vehicle. The riders 21–21' are identical and each is keyed to the cross beam 19 for non-turning sliding movement thereon. Each rider 21–21' is connected to a spider type wheel support 25, the beam 26 of which extends parallel to the long axis a of the trailer (fore to aft).

Each fore and aft end 27–28 of the beam 26 has a swivel bearing 29 for an axle 30 which extends laterally to each side thereof upon which a pair of rubber tired wheels 31 is journaled. The arrangement is such that each fore and aft end 27–28 of a beam 26 has four wheels 31 thereon, each wheel support 25 consists of eight wheels, and the entire front running gear 11 has sixteen wheels in all.

Since each wheel support 25 is secured to a particular rider 21–21' it will be appreciated that each left and right eight wheel unit, designated L and R, respectively, is shiftable laterally of the vehicle when the riders 21–21' are caused to move inwardly and outwardly relative thereto. Means 33 is provided for moving each wheel unit inwardly and outwardly. This means 33 comprises a hydraulic ram 34 which may be either fluid or air driven by suitable lines coming from a control (not shown) within the cab C of the traction vehicle 12. One end of the hydraulic ram 34 is connected as at 35 to the rider 21 on one end 20 of the cross beam 19 and the other end of the ram 34 is similarly connected to the rider 21' on the other end 20' of the cross beam 19. A suitable stop, such as a pin or lug on each end 20–20' of the cross beam 19 limits movement of each rider 21–21' relative thereto. When the hydraulic ram 34 is fed pressurized fluid in the usual manner, the ram is extended to spread the riders and consequently the wheel units L and R outwardly. However, when the pressure into the ram 34 is reversed the latter is contracted to draw the riders 21–21' inwardly to hug the terminal end 18 of the tongue 15 thus retracting the wheel units L and R into a normal permissible width for highway vehicles.

The trailer beds 13 comprise a pair of identical frames 40 each of which is identified by like reference numerals. The frame 40 of each bed 13 (FIG. 5) is a box beam consisting of a pair of I beams 41–41' joined to each other by spaced gussets 42 to maintain these beams in fixed spaced parallel relation with respect to each other. The box beam frame 40 is of sufficient length to receive and support the traction wheels of one side of a vehicle or equipment to be transported. Consequently, the box beam frame 40 is of a width to receive either the tread wheels or the link type track treads of any conventional equipment of the type to be transported. Planking P may be inserted between the upper flanges of the I beams 41–41' and supported on the gussets 42. Moreover, if greater width is required brackets 42' on the outer beams 41' may be applied to support additional planking P.

The after end of each box beam 40 terminates in a narrowed down single beam 43 (FIGS. 6 and 8) and each having a lateral cross beam 44 of half length secured intermediate its ends. These half length cross beams 44 are of a length (widthwise of the vehicle) substantially one half (4 feet minus) the normal allowed width (8 feet) for highway travel.

A spider type wheel support 25' similar to that of the front running gear is secured to each beam 43 with the wheels 31' thereof equally distributed fore and aft of the cross beam 44 and on each side of the narrow single beam 43. The details and construction of the wheel supports 25' are identical to that of the supports 25 of the front running gear 11, and the parts of each have the same reference numerals, the aft wheel supports distinguishing from those on the front gear 11 by the use of prime exponents. As best seen in FIGS. 6 and 8, the beam 26' is pivotally connected as at 22' to a pad 23' which is bolted or otherwise secured to the bottom of the half cross beam 44 to dispose the beam 26' parallel to and below the narrow single beam 43. The wheel supporting beam 26' is thus rockable about the pivot connection 22'. The same pivotal connection 22 is provided between the beam 26 and the riders 21–21' of the front running gear 11 to afford rockability of the wheel supports 25 and 25' about their respective pivotal connections 22 and 22', respectively. The swivel bearings 29 and 29' at the fore and aft ends of the wheel support beams 26 and 26' also afford rockability of the axles 30 and 30', respectively, whereby to minimize tilting of the trailer beds 13 by reason of irregularities in the terrain over which the trailer is drawn.

The fore end 45 of each box beam frame 40 is rigidly yet laterally slidably connected to the aft end 46 of the goose neck tongue 14. This connection consists of means 46 for rigidly securing the trailer beds 13 to the tongue 14 in a manner as though the tongue 14 were a fixed continuation or forward extension of the otherwise laterally movable trailer beds 13. This is accomplished by mounting the fore end 45 of each box beam 40 on dual pins 47 and 48 fixedly secured to and extending laterally from the depressed terminal end 49 of the goose neck tongue 14. The arrangement is illustrated in FIG. 4.

The pins 47 and 48 are round stock or tubular members of sufficient strength to support the load. These pins 47 and 48 are continuous members having their medial portions firmly secured in the terminal end 49 of the tongue 14 and their ends extending cantilever fashion laterally outward therefrom. The depressed terminal end 49 of the tongue 14 is offset downwardly from the fore end 50 of the latter and extends parallel to the same in a plane substantially at the height at which the trailer beds 13 are supported by the aft wheels 31'.

The terminal end 49 of the tongue 14 tapers down to a width such as to space the trailer beds 13 from each other at their narrowest position of adjustment wherein their aft wheels 31' are confined within a width (8'0") permissible for travel on the highways.

The fore end 45 of each box beam frame 40 tapers down to sleeve 51 which is of a length substantially equal to the spacing or panking between the flanges of the I beams 41–41' of such frame 40. The sleeve 51 is slidably mounted on the forward pin 47 which extends through the tongue 14 at the juncture of the offset portion of the fore end 50 thereof with the depressed terminal end 49. As a result of this arrangement the fore end 50 of the tongue 14 is of a wider width than the terminal end 49 and for greater strength and to match the width of the tongue 15 of the front running gear 11 and the diameter of a conventional turntable connection 52 therewith.

The sleeve 51 thus hugs the cantilever ends of the front pin 47, for the actual towing or pull exerted thereby upon the respective side trailer beds 13. The means 46 further includes a sleeve mount 53 formed or provided in and between each web of each set of I beams 41–41' of a particular box beam frame 40. The sleeve mount 53 of each trailer bed 13 is mounted on a respective end of the aft pin 48 and the concurrent connection of both fore and aft pins 47–48 with the fore end 45 of each trailer 13 is thus structurally rigid to maintain the latter in fixed horizontal alignment with the tongue 14 yet shiftable laterally relative thereto (the tongue 14).

Means 55 for shifting the trailer beds 13 outwardly and inwardly upon the dual pin mounting of the tongue 14 comprises hydraulic means similar to that already explained in connection with the front running gear 11. Referring to FIG. 4 the means 55 is shown to be separate hydraulic rams 56–56', one for each trailer bed 13. Each ram 56–56' has the cylinder portion welded or otherwise secured one above the other to the back face of the depressed terminal end 49 of the tongue 14. The rod of the upper ram 56 is connected as at 57 to the web of the inner I beam 41 of the right hand trailer bed 13. The other ram 56' has the end 57' of its rod connected to the inner I beam 41' of the other trailer bed 13 on the left side of the vehicle. Both rams 56–56' are connected by the usual pressure lines to controls within the cab C of the traction vehicle in the conventional manner.

When a wide load is to be carried on the trailer of the present invention the traction vehicle 12 is first driven slowly as the controls to both hydraulic means 33 and 55 are manipulated to expand the rams 34–56 and 56'. Thus with the least possible resistance all wheel units are caused to spread to their maximum extension widthwise of the vehicle. The trailer beds 13 are thereby shifted laterally to their maximum spread (dotted lines FIG. 2). The trailer can thus be spread from an eight foot width to an eleven foot width which is allowed by special permission from most state highway commissions. Any intermediate width may also be established to suit the gauge width of equipment to be carried.

The trailer beds 13 thus adjusted remain parallel to each other although independent to each other at their aft wheel supports 25'. A ramp can now be set up to load the trailer beds 13 from the rear. Wide track vehicles such as track tread tanks, earth working equipment and the like can now be drivevn up the ramps until their treads are supported entirely on the spaced trailer beds 13. The equipment carried by its own weight and structure will maintain the trailer beds 13 in parallel relation. However, should necessity require suitable blocking and tie down cables may be applied to secure the equipment carried upon the trailer beds 13.

Upon delivery of the equipment at its destination, it may be unloaded in the fashion explained in the loading thereof. Thereafter, the traction vehicle 12 is again driven slowly forward while the controls are manipulated to contract the hydraulic rams 34–56 and 56'. Thus as the the wide load trailer 10 of the present invention is drawn slowly forwardly the wheel supports L and R of the front running gear 11 as well as the front end 45 of each trailer bed 13 are retracted back to normal permissible operating width (8 feet). The trailer can now resume travel on a highway night or day without special permission.

When the trailer beds 13 are retracted as aforesaid into their narrowest adjustment the after ends 60 of each are secured together so as to cooperate with the forward dual pin mounting and locked hydraulic means in maintaining the retractable trailer 10 within allowable limits. As best seen in FIGS. 6, 7 and 8 the aft ends 60 of each trailer bed 13 has a channel shaped rear bumper and lamp mount welded to the narrowed down single beam 43 to form a T end thereon. The inner ends 61–61' of these two channel ends 60 are disposed to abut each other when the trailer beds 13 are fully retracted. A pair of blocks 62 welded one to each upper and lower flange of the channel end 60 of one trailer bed 13 (left hand— FIG. 7). These blocks 62 extend into overlapping relation relative to the channel end 60 on the other (right hand) trailer bed 13. Aligned bores through the latter channel end 60 and the extended portions of the blocks 62 overlapping the same are disposed to receive a long bolt 65 to thereby secure the aft ends of the trailer beds together.

While I have described the wide load retractable trailer in specific detail it will be appreciated by those skilled in the art that the same may be altered, modified and/or varied without departing from the spirit or scope of the invention therein. I therefore desire to avail myself of all such alterations, modifications and/or variations as may fairly come within the purview of the appended claims.

What I claim as new and desire to protect by Letters Pattent is:

1. A wide load retractable trailer adapted to be pulled by a traction vehicle and comprising in combination:
   (a) a pair of trailer beds each having a gang wheel unit at its after end for rollably supporting the same;
   (b) an intermediate tongue between said traction vehicle and said trailer beds;
   (c) a pair of pins extending through the after end of said tongue;
   (d) sleeve means on the fore end of said trailer beds each of which is slidably mounted on said pair of pins on either side of the after end of said tongue for rigidly connecting and supporting the fore end of each of said trailer beds in load bearing relation to said intermediate tongue and for limited lateral movement relative thereto; and
   (e) means between said trailer beds for spreading and contracting the same between the limits of lateral movement thereof.

2. The device in accordance with claim 1 having a front running gear comprising turntable connected to said traction vehicle, a cross beam at the aft end of said running gear and extending equidistant to each side thereof, a rider mounted for sliding movement on each extended end of said cross beam, a gang wheel unit connected to each of said riders for rollably supporting the ends of said cross beam and the aft end of said running gear, and manually controlled expandable-contractable means connected to each of said riders for spreading and drawing the latter together.

3. A wide load retractable trailer adapted to be pulled by a traction vehicle and comprising in combination:
   (a) a front running gear having its fore end turntable connected to said traction vehicle and its aft end provided with a pair of wheel units mounted for sliding movement outwardly and inwardly thereof;
   (b) a pair of trailer beds each having an independent gang wheel unit secured to its after end;
   (c) an intermediate tongue having turntable connection with said front running gear and an after end disposed in a horizontal plane level with that of said trailer beds as supported by said gang wheel units;
   (d) means between the after end of said intermediate tongue and the fore end of said trailer beds for securing them together in said horizontal plane and for sliding movement of said trailer beds outwardly and inwardly relative to each other; and
   (e) pressurized means manually controlled from within the cab of said traction vehicle and having an expandable-contractable unit between said pair of wheel units on said front running gear and between the fore ends of said trailer beds for moving the latter outwardly and inwardly at will during pulling of the same by said traction vehicle.

4. The device according to claim 3 in which said tongue has a pair of pins extending through its after end, and sleeve means on the fore end of said trailer beds each of which is slidably mounted on said pair of pins on either side of the after end of said tongue.

5. The device in accordance with claim 4 having a front running gear comprising turntable connected to said traction vehicle, a cross beam at the aft end of said running gear and extending equidistant to each side thereof, a rider mounted for sliding movement on each extended end of said cross beam, a gang wheel unit connected to each of said riders for rollably supporting the ends of said cross beam and the aft end of said running gear, and manually controlled expandable-contractable means connected to each of said riders for spreading and drawing the latter together.

6. A wide load retractable trailer for pulling by a traction vehicle and comprising in combination;
   (a) a front running gear having a tongue adapted to be connected to said traction vehicle;
   (b) a cross beam on the after end of said running gear and having its ends extending equidistant from each side of said running gear;
   (c) a gang wheel unit mounted for lateral sliding movement on each end of said cross beam;
   (d) a pair of trailer beds each having a gang wheel unit at its after end for rollably supporting the same;
   (e) an intermediate tongue pivotally connected to the tongue of said running gear and having its after end disposed in a horizontal plane between the fore ends of each of said trailer units;
   (f) means between the after end of said intermediate tongue and the fore end of each of said trailer beds for rigidly securing them together in said horizontal plane and for lateral sliding movement of said trailer beds inwardly and outwardly relative to each other and the after end of said intermediate tongue; and
   (g) expandable-contractable means between the gang wheel units of said running gear and said trailer beds for shifting them inwardly and outwardly relative to each other upon movement of said wide load retractable trailer by said traction vehicle.

7. A wide load retractable trailer for pulling connection to a traction vehicle and comprising in combination;
   (a) a front running gear having its front end pivotally connected to said traction vehicle and having its after end mounted on a cross beam the ends of which cross beam extend equidistant laterally therefrom;
   (b) a rider mounted on each of the ends of said cross beam;
   (c) a gang wheel unit having a spider wheel support pivotally connected to the underside of each of said riders for rollably supporting each end of said cross beam;
   (d) a pair of trailer beds each having a spider wheel support wheel unit at its after end for rollably supporting the same;
   (e) an intermediate tongue having its fore end pivotally connected to said running gear and having a downwardly offset portion at its after end disposed in the same horizontal plane of said trailer beds as supported by their respective wheel support units;
   (f) dual pins mounted on the offset portion at the after end of said intermediate tongue and extending equidistant from each side thereof;
   (g) a pair of sleeves formed on the fore end of each of said trailer beds and mounted on the respective ends of said dual pins for sliding movement inwardly and outwardly thereon; and
   (h) manually controlled means between the gang wheel units of said running gear and the fore end of each of said trailer beds for exerting outward and inward movement thereof relative to each other during pulling of said wide load retractable trailer by said traction vehicle.

8. The device in accordance with claim 7 in which each of the trailer beds has a bumper bar at its after end each of which bumper bar is adapted to have abutting relation with the other bumper bar when said trailer beds are fully retracted inwardly, and means between the abutting ends of said bumper bars for securing them together.

9. A wide load retractable trailer and traction vehicle comprising in combination:
   (a) a front running gear having a tongue and a turntable at its fore end for connecting the tongue to said traction vehicle;
   (b) a cross beam having its ends projecting laterally from the after end of said running gear;
   (c) a rider mounted on each end of said cross beam;
   (d) a spider wheel support including a beam pivotally connected to the under side of each rider and having lateral axles extending from each end thereof, and a wheel unit mounted on the axles extending from each end of said beam;
   (e) a pair of trailer beds each having a gang wheel unit at its after end for rollably supporting the same;
   (f) an intermediate tongue pivotally connected by a turntable connection to the tongue of said running gear;
   (g) means between the after end of said intermediate tongue and the fore end of each of said trailer beds for rigidly securing them together and for lateral sliding movement inwardly and outwardly relative to each other;
   (h) expandable-contractable means between said riders of the gang wheel units of said running gear for shifting them inwardly and outwardly relative to each other upon movement of said wide load retractable trailer by said traction vehicle; and
   (i) expandable-contractable means between the after end of said intermediate tongue and each of said trailer beds for shifting the latter inwardly and outwardly relative to each other upon movement of said wide load trailer by said traction vehicle.

10. A wide load trailer for pulling by a traction vehicle comprising:
   (a) a front running gear having its fore end pivotally connected to said traction vehicle and having a cross beam at its after end;
   (b) a gang wheel unit at the aft end of said running gear;
   (c) a rider on each end of said cross beam, each of said riders having its lower end supported by one of said gang wheel units;
   (d) an intermediate tongue pivotally connected to said running gear;
   (e) a pair of gang wheeled trailer beds each having its fore end connected to said intermediate tongue as a rigid forward extension thereof yet outwardly and inwardly movable relative thereto;
   (f) manually controlled expandable-contractable means on said intermediate tongue and connected to each of said pair of trailer beds for moving the latter inwardly and outwardly relative to each other during pulling of said trailer beds by said traction vehicle; and
   (g) means operatively related to said manually controlled means and connected to each of said riders for moving the latter inwardly and outwardly concurrently with the inward and outward movement of said trailer beds.

References Cited
UNITED STATES PATENTS

| | | | |
|---|---|---|---|
| 2,318,802 | 5/1943 | Reid | 280—34 |
| 2,732,251 | 1/1956 | Meaker | 296—23 |
| 2,741,489 | 4/1956 | Bigge | 280—405 |
| 2,772,892 | 12/1956 | Hake et al. | 280—81 X |
| 2,919,928 | 1/1960 | Hoffer | 280—81 |
| 3,021,155 | 2/1962 | Sherman | 280—81 X |

FOREIGN PATENTS 1,002,633   8/1965   Great Britain.

LEO FRIAGLIA, *Primary Examiner.*